Patented Dec. 12, 1950

2,533,284

UNITED STATES PATENT OFFICE 2,533,284

CATALYTIC HYDROCARBON CONVERSION

John A. Ridgway, Jr., Texas City, Tex., and Philip Hill, Hammond, Ind., assignors to Pan American Refining Corporation, Texas City, Tex., a corporation of Delaware Application December 27, 1946, Serial No. 718,817

4 Claims. (Cl. 196—52)

This invention relates to the cracking of hydrocarbon oils and more particularly it relates to the use of liquid hydrofluoric acid as a catalyst in cracking heavy oil such as gas oil and petroleum residues. Still more particularly the invention relates to cracking of petroleum gas oil into gasoline, gas and tar in the presence of substantial amounts of hydrofluoric acid in liquid phase. One object of the invention is to convert heavy hydrocarbons such as gas oil, into gasoline in the presence of a catalyst, substantially without the formation of carbon or carbonaceous compounds of such a character as to absorb or destroy the catalyst. Another object of the invention is to provide a process for cracking heavy hydrocarbon oils with a minimum production of dry gas and a maximum amount of condensable hydrocarbon gases of isoparaffinic structure. Still another object of the invention is to provide a hydrocarbon cracking process which selectively converts a major part of the oil to gasoline and tar suitable for heavy fuel oil with a high heating value while producing a minor amount of fixed gases such as hydrogen, methane and ethane. Other objects of the invention will become apparent from the description which follows.

This application is a continuation-in-part of our U. S. Patent No. 2,454,615, filed November 12, 1943.

Figure 1:
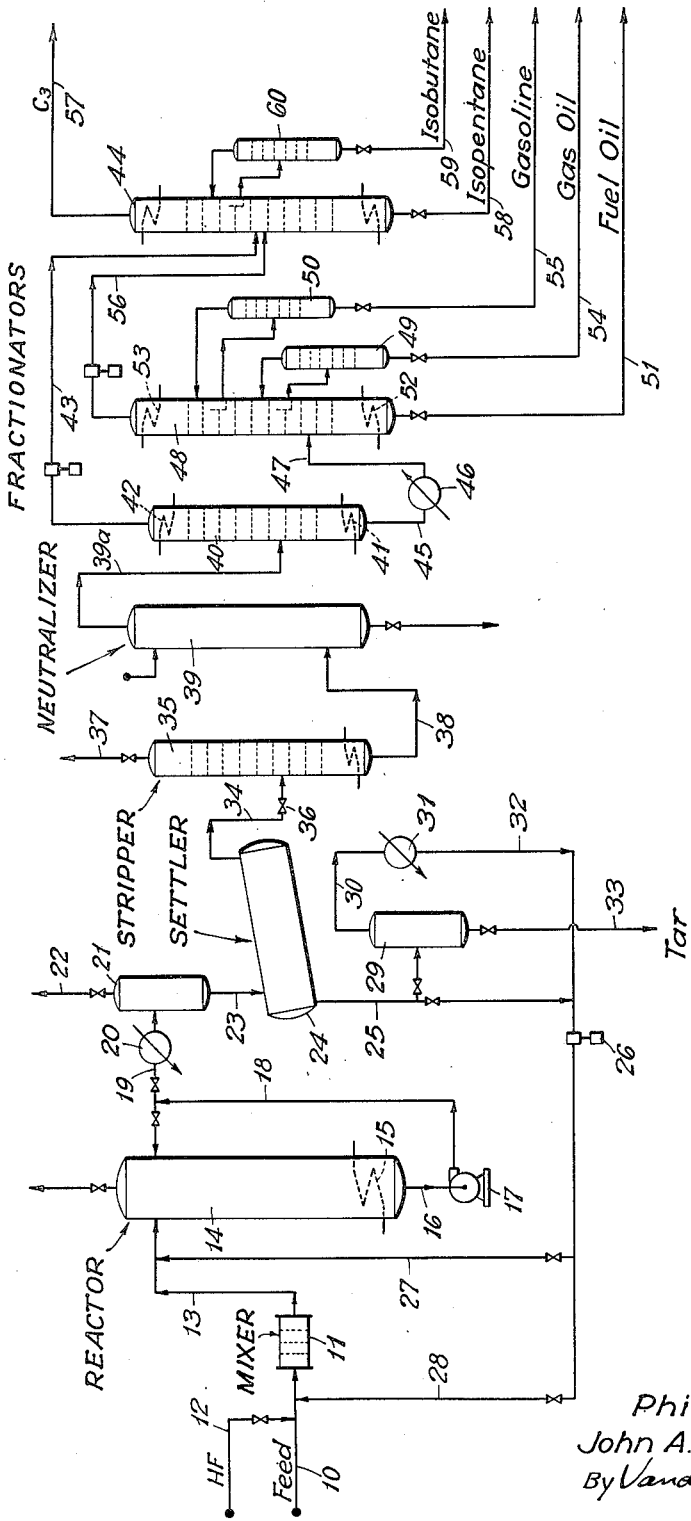
Figure 2:
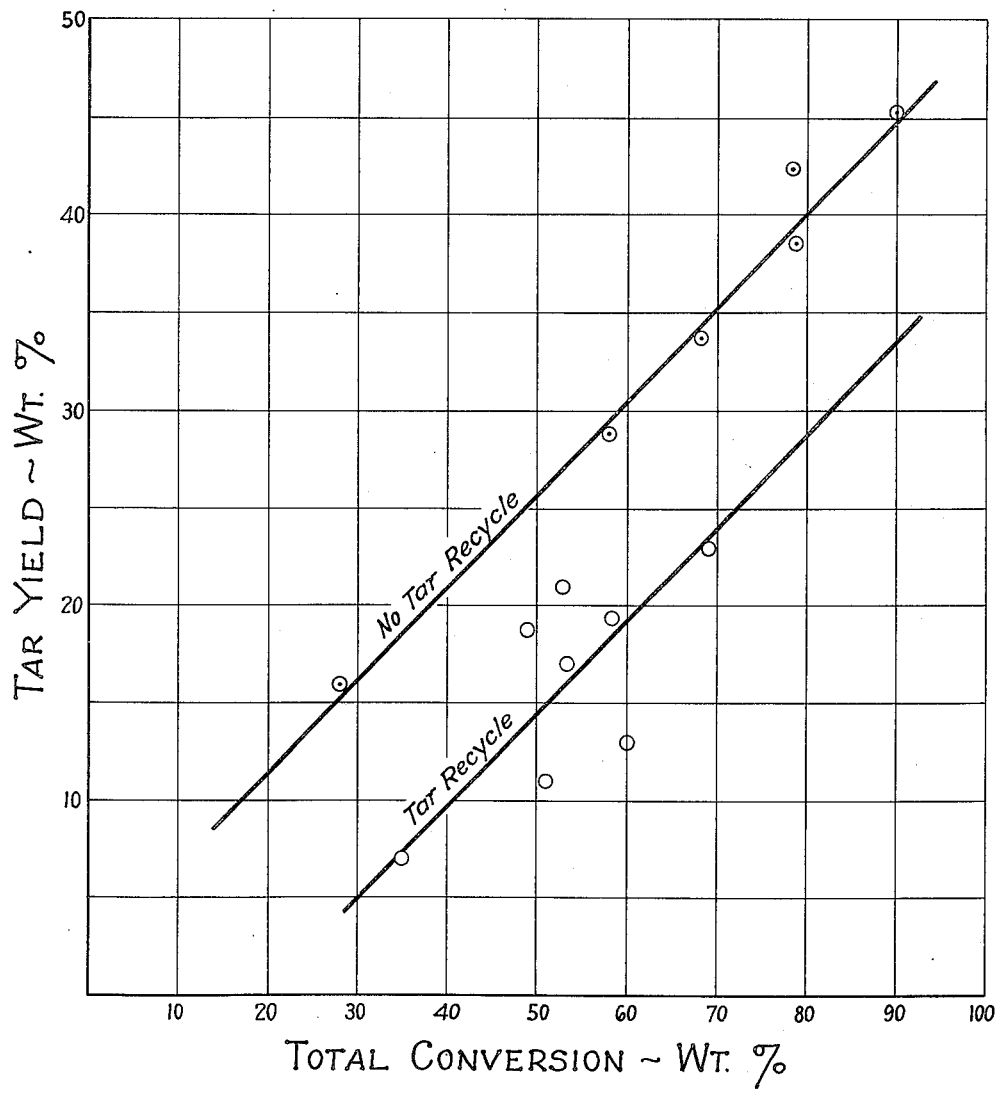

The invention is illustrated by a drawing which shows diagrammatically in Figure 1 an apparatus for carrying out the process; Figure 2 is a graph of data illustrating an advantage of the process.

Heretofore the catalytic cracking of heavy oils has been beset by the great difficulty of catalyst deterioration, some processes requiring high catalyst replacement and others requiring frequent catalyst regeneration at considerable expense. In the case of a catalyst such as aluminum chloride employed in the well-known McAfee process, the aluminum chloride suffered rapid contamination resulting in extensive aluminum chloride losses owing to catalyst degeneration. The cause of degeneration is generally traceable to the interaction of the heavy hydrocarbons and their breakdown products, with the aluminum chloride, forming more or less stable addition products or complexes as a sludge of no catalytic value. Many attempts have been made to regenerate the aluminum chloride but without much commercial success.

In the case of high temperature catalytic cracking processes employing refractory porous solid catalysts such as the active metal oxides, silica, alumina, magnesia, titania, zirconia and mixtures thereof, catalyst deactivation is very rapid and regeneration is required frequently, e. g. after a few minutes to a few hours. This regeneration is usually accomplished in the case of the refractory metal oxide catalysts by combustion with air or other oxidizing gas. In the regeneration operation, considerable quantities of carbonaceous matter accumulated on the catalyst by breakdown of the oil are removed in the oxidation.

When substantially anhydrous liquid hydrofluoric acid is employed as a cracking catalyst in substantial amounts at moderately elevated temperatures, the conversion can be carried out with substantially no carbon formation but with the formation of considerable tar and heavy fuel, i. e. high boiling conversion products. On distillation of the conversion residue, the hydrofluoric acid catalyst, having formed no permanent compounds therewith, can be recovered substantially completely for re-use in the process. The heavy conversion products produced by the action of this catalyst are valuable fuel oils after removal of HF therefrom. One of their characteristics is the high heat of combustion coupled with low specific gravity, making them very suitable for fuel purposes. We have now found that these heavy oils synthesized in the process, here-in referred to as "tar," have a valuable catalyst promoter effect in the HF conversion reaction. This application is directed to this feature of the process and more specifically to recycling the tar to the reaction zone.

The following examples illustrate the conversion of gas oil with liquid HF catalyst. The operation was continuous; the catalyst and oil being contacted in the first two runs in a vertical, packed tower. In the other two runs the reactor was equipped with a motor-driven stirrer. The pressure in the reactor was maintained at 900 p. s. i. g. to insure liquid phase conditions. The charging stock was a virgin gas oil with the following characteristics:

| | |
|---|---|
| Gavity, A. P. I. | 37.6 |
| Distillation, ASTM: | |
| Initial °F | 346 |
| 10% °F | 458 |
| 50% °F | 516 |
| 90% °F | 575 |
| Final boiling point °F | 622 |
| Refractive index $N_D^{25}$ | 1.4621 |

The cracking conditions and results are shown in the following table:

*Component yields, octane ratings and cracking conditions employed*

| Conditions | Tower Reactor | | Stirring Reactor | |
|---|---|---|---|---|
| | Run No. 1 | Run No. 2 | Run No. 3 | Run No. 4 |
| Average Reactor Temperature..°F.. | 320 | 325 | 325 | 325 |
| Charge Rate: lbs. gas oil per hour.. | .597 | 1.88 | 1.32 | 1.30 |
| Relative weight velocity (lb. oil/hr./lb. HF) | 0.14 | 0.46 | 0.58 | 0.70 |
| Contact Time, Minutes | 11 | 11 | 8 | 25 |
| Total Charge HF to Unit, Lbs... | 15.5 | 12.8 | 11.5 | 12.0 |

Average catalyst age at time of sampling (lbs. gas oil/lb. HF), 1.0–2.25.

| Products | Tower Reactor | | Stirring Reactor | |
|---|---|---|---|---|
| | Run No. 1 | Run No. 2 | Run No. 3 | Run No. 4 |
| Dry Gas ($C_3$ and lighter) | 2.6 | 0.17 | 0.07 | 0.56 |
| Excess Isobutane | 11.8 | 0.43 | 0.72 | 3.16 |
| Gasoline (400° E. P., 10.5 R. V. P.) | 47.1 | 38.00 | 38.40 | 27.80 |
| Gas Oil | 30.7 | 41.80 | 49.90 | 47.18 |
| Tar | 7.8 | 19.60 | 10.88 | 21.30 |
| Total | 100.0 | 100.0 | 100.00 | 100.00 |

OCTANE RATINGS ON GASOLINE FRACTIONS (400° E. P., 10.5 R. V. P.)

| ASTM Motor Method: | | | | |
|---|---|---|---|---|
| Clear | 68.9 | 69.7 | 65.3 | 69.0 |
| 1 cc. TEL | 79.0 | 80.3 | 77.0 | 79.7 |
| ASTM Research Method: Clear | 68.4 | 69.4 | 66.5 | 70.1 |

From these results it will be noted that there is a decrease in yield of gasoline with an increase in the relative weight velocity.

In batch operations, the following data show the results obtained from two runs on virgin gas oil carried out in a shaking bomb:

| Conditions | Run No. 1 | Run No. 2 |
|---|---|---|
| Per cent Cat. by Weight | 295 | 193 |
| Per cent Cat. by Volume | 234 | 158 |
| Per cent Cat. by Mols | 2300 | 2160 |
| Time, hours | 4 | 4 |
| Temperature, °C | 155–165 | 155–162 |
| Max. pressure, lbs./sq. in | 910 | 840 |

| Products, wt. percent of Charge | Run No. 1 | Run No. 2 |
|---|---|---|
| Gas: | | |
| $C_1$ | 0.22 | 0.08 |
| $C_2$ | | |
| $C_3$ | 4.05 | 2.47 |
| $iC_4$ | 20.3 | 14.20 |
| $nC_4$ | 2.13 | 1.11 |
| $iC_5$ | 7.27 | 6.20 |
| $nC_5$ | 1.16 | 0.60 |
| Total Gas | 35.1 | 24.6 |
| Liquid Distillate: | | |
| $C_6$–100° C | 6.0 | 3.9 |
| 100–200° C | 4.7 | 8.7 |
| 200+°C | 9.0 | 20.7 |
| Total Gasoline | 10.7 | 12.6 |
| Total Recycle Stock | 9.0 | 20.7 |
| Total Reacting | 91.0 | 79.3 |
| Tar | 45.2 | 42.1 |
| Yield Data (Based on amount reacting): | | |
| Total gas ($C_5$, $C_4$, $C_3$ percent and lighter) | 38.6 | 31.0 |
| Gasoline ($C_6$–200° C.), percent | 11.7 | 15.9 |
| Gas+gasoline, percent | 50.3 | 46.9 |
| Tar, percent | 49.7 | 53.1 |

These results also show the importance of maintaining a substantial portion of HF catalyst in the conversion reaction. Thus, the total amount of conversion (total reacting) in run 1 with 295 per cent of HF was 91 compared with 79.3 in run 2, in which the conditions were the same except that the proportion of catalyst was less, i. e. 193%. In general, it is desirable to employ an amount of catalyst equal to at least half the weight of the oil treated and a catalyst-oil ratio in the range of 1:1 to 3:1 is desirable.

The tar produced in these runs corresponds to 13.3% and 17.9% respectively, based on the weight of the tar-HF phase. In general better results are obtained with higher tar concentration, e. g. above 15% in the HF phase, readily obtainable by recycling.

Inspection of the above results also shows that the increased proportion of catalyst employed in run 1 favors the production of isobutane, a valuable product for use in alkylation and other reactions. Altho the recovery of tar in run 1 appears to be slightly larger than in run 2, when correction is made for the increased conversion in run 1 (91.0 v. 79.3) the tar yield will be seen to be less with increased proportion of catalyst to oil. (Note yield based on percent reacting 49.7 v. 53.1.) The temperature employed in liquid HF cracking catalyst is unusually low for catalytic conversion reactions. In our process the temperature is usually about 100 to 230° C., preferably about 140 to 175° C. In case a promoter is used with the HF, the temperature may be even lower, e. g. as low as 50° C.

The reaction time may vary over a considerable range depending primarily on the temperature and the ratio of catalyst-to-oil treated. Thus, in an example in which 193% of HF was used to convert virgin gas oil, the total gas yield obtained from virgin gas oil at 135 to 145° C. was only 2.4% at a reaction time of two hours and 7% at five hours' reaction time. However, in another example with the same catalyst concentration but with a conversion temperature of 155 to 162° C., an increase in reaction time of from 1½ to 4 hours increased the gas yield from 3.4 to 24.6 per cent. In general, it appears that a conversion temperature of 150° C. or above is necessary for appreciable gas production within a period of four hours or less.

The apparent low yield of "gasoline" in the batch runs must be corrected by adding thereto the $C_5$ and most of the $C_4$ hydrocarbons when comparing with the usual conversion data on gasoline of 9 to 12 pounds R. V. P. On this basis the gasoline yield in batch run 2 would be about 44% based on amount reacting.

In carrying out the process, we prefer to operate in a continuous manner as illustrated in Figure 1 of the drawing. Referring to the drawing, a suitable feed stock, for example a virgin gas oil of 35° A. P. I. gravity having a boiling range of about 345 to 650° F., is charged to the system by line 10 leading to mixer 11, preferably at reaction temperature or above. Any suitable mixing device may be used such as an orifice mixer consisting of a series of orifice plates thru which the feed stock is forced to flow at high velocity. Liquid HF is charged to the system by line 12 and mixed with the hydrocarbon feed in mixer 11. The mixture then flows by line 13 to reaction chamber 14. The volume of the reaction chamber is sufficient to provide the desired reaction time, for example ten minutes to four hours depending on the temperature, character of the feed stock, etc. The amount of HF employed in the reaction zone is sufficient to maintain a separate liquid catalyst phase and it is desirable to employ a considerable excess above that required to saturate the hydrocarbons.

It is not necessary to mix the HF and feed stock before introducing into reactor 14 but these stocks may be injected directly into the reactor thru separate lines if desired, contact between them being obtained entirely within the reaction chamber. In most case the liquid HF phase within the reaction chamber will be lighter than the hydrocarbon phase and will occupy an upper position in the reaction chamber. In this case it is desirable to introduce the hydrocarbon feed into the upper part of the reaction chamber and allow it to flow downwardly therethru in contact with the liquid HF phase therein. Where the conditions are such that the HF catalyst phase is heavier than the hydrocarbon stocks in the reaction chamber 14, it is preferred to introduce the feed stock at a low point in the reaction chamber and withdraw it at a point near the top.

The temperature of the reaction chamber 14 is maintained above about 100° C. and generally within the range of 125° C. to 200° C., a suitable temperature being about 150 to 160° C. Higher temperatures may be employed for short reaction periods. Any suitable heating means may be employed for the purpose, for example coil 15 supplied with hot oil from steam or other heating fluid. We can also preheat the HF catalyst and hydrocarbon feed stock in separate heaters, not shown, previous to introducing it to reaction chamber 14. In some cases it is convenient to supply a portion of the feed as a vapor in sufficient amount to control the reaction temperature.

The hydrocarbon stock and HF in reaction chamber 14 may be agitated to obtain the necessary contact between the two liquid phases to effect catalytic conversion, altho in some cases the degree of contact obtained by distributing the feed stock in small streams above a less dense liquid HF layer thru which the hydrocarbon passes in small streams or droplets will provide sufficient contact. Mechanical agitators may be installed directly in the reaction chamber or agitation may be provided both internally and externally of the reaction chamber as indicated in the drawing. According to this method, the reaction mixture is withdrawn by line 16 from the bottom of chamber 14 and conducted by pump 17 thru line 18 back to the top of the reaction chamber. By controlling the circulation rate, any desired degree of interspersion of the liquid catalyst phase and the oil phase may be obtained.

A controlled stream of reaction products is withdrawn by valved line 19 leading thru cooler 20 to separator 21 from which some of the lighter gaseous reaction products can be withdrawn by line 22. Liquid reaction products are conducted by line 23 to catalyst settler 24. Settler 24 is preferably a horizontal, cylindrical, elongated chamber thru which the reaction products flow continuously without agitation, thereby allowing the liquid HF phase associated with tar to separate at the bottom of settler 24. We have found that on cooling the mixture of hydrocarbon oils in liquid HF, an inversion of the layers commonly occurs because of a higher volumetric temperature coefficient of HF. Thus, where the HF may form the upper layer at a temperature of 160° C. it will usually be the lower layer below the hydrocarbon at a temperature of 20° to 40° C. The catalyst layer containing heavy hydrocarbons in solution can be conducted directly by line 25 and pump 26 to reactor 14 by line 27, or to mixer 11 by line 28 for the treatment of fresh amounts of hydrocarbon feed stock. If desired, however, a part or all of the stream may be diverted to tar separator 29 wherein HF is distilled or stripped from the tar, the HF vapor being withdrawn by vapor line 30 leading to condenser 31 whence it is recycled by line 32 and pump 26 to reactor 14. The tar from which the HF has been completely or substantially removed is withdrawn from the system by line 33. In this stripping step, light hydrocarbons can also be removed with the HF and recycled.

We have found that the recycle of the tar or HF-soluble fraction to the reactor is important in increasing catalyst activity in the cracking reaction catalyzed by HF and we prefer to recycle sufficient tar, usually in HF solution, to maintain a concentration of tar in the liquid HF phase above about 15 per cent by weight based on the weight of the catalyst phase in the reactor. Note that in the batch operations hereinabove the catalyst phase contained 13.3 and 17.9 per cent of tar respectively.

The hydrocarbon reaction products are withdrawn from settler 24 by line 34 to stripper 35. The pressure is reduced at valve 36, preferably to about 50 to 200 p. s. i. In stripper 35, most of the dissolved HF of which relatively little is present in the oil phase from settler 24 is eliminated as an azeotrope with hydrocarbon gases and conducted away by line 37 to a condenser or other means for HF recovery. Recovered HF vapor may, if desired, be recycled to the reactor 14. The liquid hydrocarbon products are withdrawn from tower 35 by line 38 leading to neutralizer 39 wherein traces of HF remaining in the hydrocarbon stream are removed by an alkaline neutralizing agent such as sodium carbonate, sodium hydroxide, lime, etc., either solid or in solution or by adsorption with a suitable adsorbent for HF such as fuller's earth, silica gel, bauxite, or one of the acid-adsorbing nitrogen-base resins employed in water treating. In the case of certain stocks and other types of operation, where the amount of HF remaining in the products withdrawn from stripper 35 is very small, the neutralizer may be omitted entirely.

From neutralizer 39 reaction products pass by line 39a to fractionator 40. Heat is supplied to the fractionator by reboiler coil 41 and reflux by cooling coil 42. Light products including butanes and lighter hydrocarbons are distilled off thru line 43 leading to fractionator 44.

The principal liquid hydrocarbon products are withdrawn from the bottom of fractionator 40 by line 45 and heated in heater 46 which may be a pipe still for example. From heater 46 the liquid products are conducted by line 47 to fractionator 48 provided with gas oil and gasoline side strippers 49 and 50 respectively. A heavy fraction suitable for fuel oil or asphalt manufacture is withdrawn at the bottom by line 51. Heat required for reboiling in fractionator 48 is supplied by coil 52 while reflux cooling is supplied by coil 53. The gas oil fraction withdrawn by line 54, if desired, may be conducted back to reactor 14 or mixer 11 as feed stock for the process. The gasoline withdrawn by line 55 is essentially a heavy blending naphtha.

Pentane and lighter hydrocarbons are withdrawn from fractionator 48 by vapor line 56 leading to fractionator 44 to which vapors from fractionator 40 may also be conducted. Propane and lighter products are discharged by vapor line 57 while the pentane is removed as the bottom stock by line 58 and butane is withdrawn by line 59 from side stripper 60. The pentane and butane streams produced in the process consist largely of isopentane and isobutane. The isopentane is chiefly valuable for blending in aviation fuels and other high knock rating gasoline. Both isopentane and isobutane may be subjected to alkylation with suitable olefins, for example ethylene, propylene or butylene, to produce alkylate gasoline, neohexane, isooctane, triptane, etc., very desirable constituents of aviation fuels.

The following data illustrate the importance of recycling tar to the reaction zone. They were obtained from two runs in one of which the HF-tar phase was recycled. In the other run the operation was "once thru" with respect to catalyst. None of the hydrocarbons was recycled in either run.

| Operating conditions | Catalyst recycle | No catalyst recycle |
| --- | --- | --- |
| Average Reactor Temperature, °F | 350 | 350 |
| Reactor Pressure, p. s. i. g | 900 | 900 |
| API Gravity-Gas Oil Charge | 36.9 | 36.9 |
| Charging Rate: Volume of Oil per Hour per Unit Reactor Volume | 0.56 | 0.84 |
| Relative Weight Velocity, Lbs. per Hour per Lb. of Catalyst | 1.1 | 1.5 |
| Catalyst—Oil Ratio in Reactor | 4.2 | 3.0 |
| Contact Time, minutes | 13.4 | 12.0 |

| Products | Yields on charge, weight percent | |
| --- | --- | --- |
| | Catalyst recycle | No catalyst recycle |
| Dry Gas (C₃ and lighter) | 0.8 | 0.2 |
| Excess Isobutane | 2.5 | 0.0 |
| Gasoline (400° E. P., 10.0 RVP) | 33.0 | 15.8 |
| Gas Oil: | | |
| Hydrocarbon phase | 46.5 | 62.5 |
| HF phase | 0.0 | 12.9 |
| Total | 46.5 | 75.4 |
| Tar boiling above charge | 17.2 | 8.6 |
| Gas Oil Conversion | 53.5 | 24.6 |
| (10# gaso+isobutane)/tar | 2.06 | 1.94 |

KNOCKING CHARACTERISTICS OF GASOLINE
(400° E. P. 10.0 RVP)

| ASTM Motor Method: | | |
| --- | --- | --- |
| Clear | 69.1 | 69.0 |
| Plus 1 cc. TEL | 79.9 | 79.8 |
| ASTM Research Method: Clear | 70.6 | |

It will be observed from these data that whereas the cracking conditions were substantially the same in the two runs, the contact time being only slightly longer in the first run, the yield of gasoline in the first run was approximately double that obtained in the second run, i. e. 38.3% by volume in comparison with 19.1%.

These data show that the recycle of HF-soluble hydrocarbons from the reaction products separated as an insoluble HF-tar phase has the effect of greatly increasing the cracking rate. In addition the data suggest that there is an actual decrease in the amount of hydrocarbons which are degraded to tar (52.1 parts of tar per 100 parts of gasoline produced vs. 54.3), indicating that the recycle of tar to the reactor and the maintenance of a higher tar concentration therein serve to reduce tar formation. This effect is also shown in the curves in Figure 2 in which the overall tar yield is plotted against total conversion. The upper curve corresponds to the tar produced in a number of runs in which no tar was recycled but only the amount of tar produced in the conversion was present during the reaction. The lower curve corresponds to data obtained from a series of runs in which the charging stock, gas oil, was continuously converted in a reactor to which the HF tar phase was recycled from the product separator in accordance with the operation shown diagrammatically in Figure 1. It will be noted that the amount of tar produced from a given amount of charging stock is considerably less in the case where tar is recycled to the reactor increasing the concentration of tar in the HF catalyst phase.

As indicated hereinabove, one of the important advantages of this process of hydrocarbon conversion over other catalytic processes lies in the substantially complete recovery of catalyst without necessity of regeneration. Most of the catalyst separates as a separate liquid layer while the remainder is removed by simply stripping or distilling the HF from the reaction products. Substantially no undecomposable sludge or catalyst complex is formed in the reaction and therefore very little fresh catalyst must be added by way of replacement beyond that necessary to compensate for mechanical losses.

The conversion action of liquid HF may be modified if desired by adding small amounts of certain other reagents or promoters; for example by adding $BF_3$ the product distribution may be substantially altered. Amounts used are generally only about 1 to 10%. When using such promoters it is desirable to either recover the promoter along with the HF or if the promoter is discarded it is desirable to recover the HF therefrom, for example by distillation. In the case of $BF_3$ it may be recovered from the gaseous hydrocarbon reaction products by means not shown in the drawing.

Hydrogen may also be employed in the HF conversion reaction to modify the character and amount of tar or asphalt formed. The amount employed can be in the range of 1000 to 3000 cubic feet per barrel of oil treated. Hydrogen pressures of 500 to 3000 p. s. i. are suitable. Hydrocarbon gases containing hydrogen may be used instead of hydrogen and hydrogen-containing gases produced in the process may thus be employed. In the HF catalytic cracking process, the gas produced consists chiefly of butanes and pentanes and in most cases these fractions contain about 88 to 93 per cent of isoparaffins. No neohexane has been detected. The butane yields are especially high; for example 22.4 per cent from virgin gas oil and 28.7 per cent from dodecene. The heavier charging stocks tend to produce less dry gas, that is propane and lighter hydrocarbons and hydrogen, than the lighter charging stocks. All gas is completely saturated. If desired, the $C_4$ and $C_5$ fractions may be allowed to remain with the "gasoline" instead of being separated as shown hereinabove. It is generally preferred to operate the process with sufficient cracking to yield products having a 90% point—ASTM—below the 10% point of the charging stock.

The concentration of isobutane and isopentane is much higher than would be expected from the equilibrium values calculated from thermodynamic data, which may indicate that isomerization occurs prior to or simultaneously with the cracking reaction in the presence of HF. For comparison, the concentration of isobutane in the catalytic isomerization of butanes is only about 65%.

The "gasoline" obtained in the process is usually substantially free of unsaturation. As shown in the table hereinabove, the octane number is about 70, and it is characterized by a high lead response, i. e. the addition of a small amount of tetraethyl lead increases the knock rating very materially as is characteristic with isoparaffinic hydrocarbons.

The tar produced in the process after the elimination of HF therefrom is characterized by a high specific gravity, for example about 1 to 1.15. A typical specimen of tar from a tar recycling operation had the following characteristics:

| | |
|---|---|
| Density, D60/60 | 1.12 |
| API gravity | −5 |
| Softening point (ball and ring) °F | 145 |
| Penetration,[1] 200 gms. 60 secs. at 32° F | 0 |
| Penetration,[1] 50 gms. 5 secs. at 115° F | 153 |
| Penetration,[1] 100 gms. 5 secs. at 77° F | 13 |
| Ductility, 5 cms. per min. at 77° F | 150+ |
| Flash point (Cleveland open cup) °F | 340 |
| Solubility in carbon tetrachloride weight per cent | 100 |
| Solubility in n-heptane do | 67.5 |
| Solubility in acetone do | 82.3 |
| Iodine number (Wijs) | 140 |
| Fluorine content weight per cent | 0.05 |
| Ultimate analysis: | |
| Carbon weight per cent | 91.9 |
| Hydrogen do | 7.9 |
| Molecular weight (Menzies boiling point) | 420–425 |

[1] In 0.01 cm.

The excess tar not needed for recycling to the reaction zone can be employed as a heavy fuel oil or it may be converted into asphalt by heating and/or blowing with air, blending with other asphaltic stocks, etc.

Because of its high unsaturation it possesses drying properties making it useful as a component for coating compositions.

Altho we have described our process primarily as it is applied to the conversion of gas oil, it may also be applied to low knock rating heavy naphthas boiling, for example, in the range of about 325 to 450° F. where it is desired to obtain lighter hydrocarbons and particularly isoparaffinic $C_4$ and $C_5$ hydrocarbons for alkylation and other special purposes.

In copending application for Letters Patent, Serial No. 731,744, filed by Herschel D. Radford et al. on March 1, 1947, now Patent No. 2,527,573, there is claimed a process for cracking heavier-than-gasoline hydrocarbons with liquid hydrogen fluoride, discharging the reaction mixture into a hot settler from which an HF-tar mixture is recycled to the cracking reactor, discharging a converted oil-HF mixture from the hot settler into a cold settler, and recycling hydrogen fluoride from the cold settler to the reactor.

Having thus described our invention, what we claim is:

1. In the process of manufacturing gasoline by cracking heavier hydrocarbon oils in the presence of a catalyst consisting essentially of hydrogen fluoride, wherein said oil is intimately contacted with said hydrogen fluoride in a reaction zone at a temperature above about 100° C. and under sufficient pressure to maintain a liquid catalyst phase in said reaction zone, gasoline is produced in said reaction zone concurrently with the production of unsaturated tarry products soluble in said catalyst phase, withdrawn from said reaction zone and separated from catalyst, the improvement comprising maintaining within said reaction zone an amount of said tarry products substantially in excess of the amount produced in once-thru conversion of said hydrocarbon oils.

2. The process of converting a heavy hydrocarbon oil into gasoline and similar lower boiling products which comprises introducing a stream of a heavy hydrocarbon oil boiling above gasoline into a reaction zone containing a body of liquid hydrofluoric acid catalyst, maintaining the temperature of the reaction zone in the range of about 100 to 300° C., maintaining sufficient pressure in the reaction zone to provide a liquid catalyst phase therein, retaining said body of catalyst within said reaction zone and intimately contacting said oil with said catalyst, thereby substantially converting it into gasoline and a heavy tar higher boiling than said heavy hydrocarbon oil charged and soluble in said catalyst phase, separating gasoline from the catalyst and tar and withdrawing it from the system and maintaining the concentration of tar in said catalyst phase above about 15% by weight.

3. The process of claim 2 wherein the concentration of tar in the catalyst phase in said reaction zone is controlled by withdrawing a portion of the catalyst phase therefrom and subjecting it to stripping and reduced pressure, thereby removing HF from the tar component thereof and recycling said removed HF to said reaction zone.

4. The process of manufacturing gasoline by cracking a heavier hydrocarbon oil which comprises subjecting it at an elevated temperature to the action of a catalyst consisting essentially of a solution of tar and liquid HF, whereby said heavy hydrocarbon oil is substantially converted into gasoline and high-boiling tar, separating gasoline-containing hydrocarbon products from the tar-HF catalyst phase, separating tar from the catalyst phase and withdrawing it from the process, recycling HF to the conversion reaction and recycling sufficient tar to the conversion reaction to maintain a high specific gravity of about 1 on said tar withdrawn from the process.

JOHN A. RIDGWAY, Jr.
PHILIP HILL.

REFERENCES CITED

The following references are of record in the file of this patent:

UNITED STATES PATENTS

| Number | Name | Date |
|---|---|---|
| 2,357,495 | Bloch | Sept. 5, 1944 |
| 2,378,762 | Frey | June 19, 1945 |
| 2,405,993 | Burk | Aug. 20, 1946 |
| 2,416,184 | Lee et al. | Feb. 18, 1947 |
| 2,425,559 | Passino et al. | Aug. 12, 1947 |
| 2,449,463 | Evering et al. | Sept. 14, 1948 |
| 2,454,615 | Ridgway et al. | Nov. 23, 1948 |